James H. Gridley.

Locking Washer for Nuts.

4406

REISSUED MAY 30 1871

Witnesses.

Octavius Knight

John D. Denison

Inventor.

James H. Gridley

UNITED STATES PATENT OFFICE.

JAMES H. GRIDLEY, OF WASHINGTON, DISTRICT OF COLUMBIA, ASSIGNOR TO HADWEN L. PURDIE.

IMPROVEMENT IN LOCKING-WASHERS FOR NUTS.

Specification forming part of Letters Patent No. 62,483, dated February 26, 1867; reissue No. 4,354, dated April 25, 1871; reissue No. 4,406, dated May 30, 1871.

Be it known that I, JAMES H. GRIDLEY, of Washington, in the county of Washington and District of Columbia, have invented a new and Improved Locking-Washer for Nuts; and I do hereby declare the following to be a full, clear, and exact description of the nature, construction, and operation of the same, sufficient to enable those skilled in the art to which my invention appertains to fully understand and use the same, reference being had to the accompanying drawing forming a part of this specification, and in which—

Figure 1:
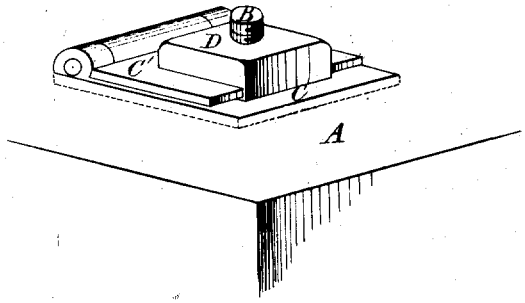
Figure 4:
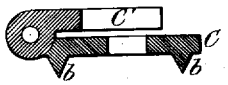
Figure 2:
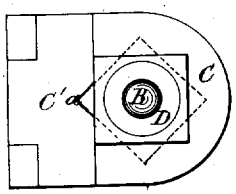
Figure 3:
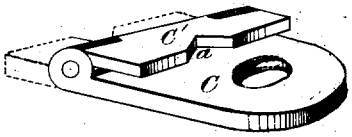

Figure 1 is a perspective view. Fig. 2 is a plan. Fig. 3 is a persective view of a detached locking-washer. Fig. 4 is a section.

My invention relates to means for locking nuts of screws or bolts, whereby they may be prevented from becoming loose by jars or other causes. The invention consists, first, in a new way of locking them at every fourth revolution by a hinged or pivoted plate made to rise and fall, as hereinafter specified; secondly, in a new way of locking them at every eighth revolution by means of a straight edge and angular recess on the same plate, as hereinafter described; thirdly, in a new way of fastening the hinged or pivoted plate by combining it with the washer of the nut, made fast in any suitable manner; fourthly, in the combination of the washer and hinged or pivoted flap with talons on the back of the washer, as hereinafter described.

In the drawing, A, Fig. 1, may be taken as the face of a bridge-beam, through which the bolt B is passed. D is a nut screwed onto the bolt, and C is a washer underneath the nut. To the washer proper is hinged or pivoted a flap or leaf, C′, which, when raised, permits the nut to be rotated either for removal or tightening, and when folded down comes in contact with a side or sides of the nut, so as to prevent the latter from turning. Fig. 2 shows the folding portion C′ so arranged as to lock the washer at quarter or one-eighth turns, the side of the nut being in contact with the edge of the leaf, or the angle of the nut D projecting into the notch *a* in the edge of the leaf C′. Fig. 3 is a perspective view of a detached locking-washer, in which the bolt-hole *b* has a flat side to correspond to one side of a bolt, from which the threads have been removed.

It does not materially weaken a bolt to remove a portion of its threads so long as the barrel of the bolt is left intact, and the washer, Fig. 3, being placed upon a bolt with one side thus flattened, will not rotate thereon. The nut then being screwed on, and the leaf C′ folded down against it, as seen in Figs. 1 and 2, the nut and washer are rendered secure from becoming loose.

Fig. 4 is a section showing talons *b b* on the back of a washer, adapted to pierce into wood and secure it from turning.

A circular flange may project from the back of the washer and be countersunk in the wood. A square hole through this may be occupied by a square portion of the bolt, and the washer thus be prevented from turning on the bolt; or a square hole through the washer may fit a bolt of corresponding form. Thus it is apparent that either the object to which it is attached or the bolt itself may present the obstacle to the turning of the washer.

*Claims.*

Having thus described my invention, what I claim therein as new, and desire to secure by Letters Patent, is—

1. In combination with a threaded nut working on a screw or bolt, a hinged or pivoted plate whose edge or edges fall close to and parallel with one or more of the sides of said nut, for the purpose specified.

2. In the same plate for locking nuts, a straight edge falling parallel to one side of the nut, and an angular recess shaped to correspond with the corners of the nut, for the purpose specified.

3. A hinged or pivoted nut-lock, combined with the washer of the nut, as and for the purpose specified.

4. The combination of the washer C and hinged or pivoted flap C′ with the talons *b* on the back of the washer, substantially as described.

JAMES H. GRIDLEY.

Witnesses:

OCTAVIUS KNIGHT,
H. C. ELLIOTT.